(12) United States Patent
Williams

(10) Patent No.: US 8,674,227 B2
(45) Date of Patent: Mar. 18, 2014

(54) HIGH PERFORMANCE CABLE SPLICE

(75) Inventor: Brian James Williams, York, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 1009 days.

(21) Appl. No.: 12/188,246

(22) Filed: Aug. 8, 2008

(65) Prior Publication Data

US 2010/0032205 A1   Feb. 11, 2010

(51) Int. Cl.
*H02G 15/08* (2006.01)

(52) U.S. Cl.
USPC ........................................................ 174/88 R

(58) Field of Classification Search
USPC ................... 174/113 R, 113 C, 88 R, 70 R
See application file for complete search history.

(56) References Cited

U.S. PATENT DOCUMENTS

| | | | | |
|---|---|---|---|---|
| 2,639,312 A * | 5/1953 | Kerwin | | 174/138 F |
| 2,698,926 A | 1/1955 | Young | | |
| 3,404,216 A | 10/1968 | Amann et al. | | |
| 3,994,090 A * | 11/1976 | Wheeler | | 40/316 |
| 4,266,992 A | 5/1981 | Agaisse | | |
| 4,424,410 A | 1/1984 | Edgerton | | |
| 4,586,774 A | 5/1986 | Didier | | |
| 4,710,593 A * | 12/1987 | Hall et al. | | 174/88 R |
| 4,837,409 A | 6/1989 | Klosin | | |
| 4,885,432 A | 12/1989 | Amoyal et al. | | |
| 4,972,042 A * | 11/1990 | Seabourne et al. | | 174/23 R |
| 5,132,495 A | 7/1992 | Ewing et al. | | |
| 5,251,373 A | 10/1993 | DeCarlo et al. | | |
| 5,281,763 A * | 1/1994 | Hey et al. | | 174/84 R |
| 5,492,740 A | 2/1996 | Vallauri et al. | | |
| 5,656,797 A | 8/1997 | Lin | | |
| 5,692,299 A | 12/1997 | LinDaems et al. | | |
| 5,766,040 A | 6/1998 | Naerland et al. | | |
| 5,900,585 A | 5/1999 | Winfield et al. | | |
| 6,116,965 A * | 9/2000 | Arnett et al. | | 439/692 |
| 6,310,295 B1 * | 10/2001 | Despard | | 174/113 R |
| 6,495,757 B2 * | 12/2002 | Van Boxstael et al. | | 174/88 R |
| 6,583,351 B1 | 6/2003 | Artman | | |
| 6,910,870 B2 * | 6/2005 | Ebner | | 417/422 |
| 7,256,350 B2 | 8/2007 | Stagi et al. | | |
| 7,511,222 B2 * | 3/2009 | Taylor et al. | | 174/84 R |
| 7,834,271 B2 * | 11/2010 | Gromko et al. | | 174/113 R |
| 2002/0023771 A1 * | 2/2002 | Gerencir | | 174/88 R |
| 2004/0026113 A1 * | 2/2004 | Bahlmann et al. | | 174/113 C |
| 2004/0035603 A1 | 2/2004 | Clark et al. | | |

FOREIGN PATENT DOCUMENTS

DE         78 34 660         4/1979

OTHER PUBLICATIONS

International Search Report, International Application No. PCT/US2009/004538, International Filing Date Jul. 8, 2009.

* cited by examiner

*Primary Examiner* — Chau Nguyen

(57) ABSTRACT

A cable repair system having a splicing member. The splicing member includes at least two conductor pairs and an insulation member disposed intermediate to the at least two conductor pairs. The insulation member is configured to shield the conductor pairs from electrical interference from adjacent conductor pairs. The conductor pairs and insulation member are configured to permit splicing of two more cable segments. A method for splicing a data cable and a repaired cable are also disclosed.

13 Claims, 3 Drawing Sheets

HIGH PERFORMANCE CABLE SPLICE

FIELD OF THE INVENTION

This disclosure relates to wire or cable repair and connection methods and systems.

BACKGROUND OF THE INVENTION

Known cable or wire splicing methods include direct wire contact with crimping, soldering or similar connection methods. Known methods are generally unsuitable for high speed data type connections or repairs due to crosstalk and interference at the point of connection What is needed is a system and method for repair of high-speed data wires or cables that does not suffer from the drawbacks of known splicing methods.

SUMMARY OF THE INVENTION

One aspect of the present disclosure includes a cable repair system having a splicing member. The splicing member includes at least two conductor pairs and an insulation member disposed intermediate to the at least two conductor pairs. The insulation member is configured to shield the conductor pairs from electrical interference from adjacent conductor pairs. The conductor pairs and insulation member are configured to permit splicing of two more cable segments.

Another aspect of the present disclosure includes a method for splicing a data cable. The method includes providing a first cable segment having at least two conductor pairs and a second cable segment having at least two conductor pairs. A splicing member having at least two conductor pairs and an insulation member disposed intermediate to the at least two conductor pairs is provided. The insulation member is configured to shield the conductor pairs from electrical interference from adjacent conductor pairs. The at least two conductor pairs of the first cable segment are connected to the at least two conductor pairs of the splicing member. The at least two conductor pairs of the second cable segment are connected to the at least two conductor pairs of the splicing member.

Still another aspect of the present disclosure is a repaired cable having a first cable segment having at least two conductor pairs and a second cable segment having at least two conductor pairs. The repaired cable also includes a splicing member having at least two conductor pairs in electrical communication with the conductor pairs of the first cable segment and the conductor pairs of the second cable segment and an insulation member disposed between the at least two conductor pairs, the insulation member being configured to shield the conductor pairs from electrical interference from adjacent conductor pairs.

An advantage of the method and system for the present disclosure includes a splice having no or minimal electrical data transmission loss with reduced or eliminated crosstalk between conductor pairs.

Another advantage of the method and system of the present disclosure includes a portable system that is capable of use in the field or in rugged environments.

Still another advantage is that the splice system provides an environmentally sealed barrier suitable for a wide variety of environments.

Still another advantage is that the splice system is scalable from, for example, a two pair conductor pair system to a system having tens or hundreds of conductor pairs.

Still another advantage includes a low profile geometry that does not significantly increase the overall diameter of the cable, allowing the repaired cable to be pulled or installed according to conventional conductor installation methods.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
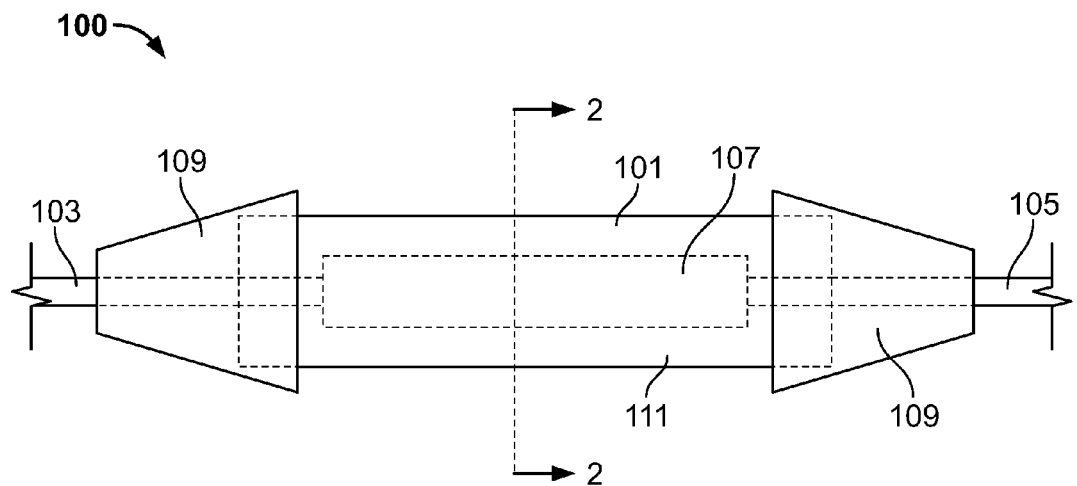
FIG. 1 shows a cable repair system 100 according to an embodiment of the present disclosure

FIG. 1 shows a cable repair system 100 according to an embodiment of the present disclosure. The system includes a cable splice 101 electrically connecting a first cable segment 103 to a second cable segment 105. The first and second cable segments 103, 105 are preferably wires capable of transferring signals or data. "Cable" as utilized herein, is a configuration of conductors, such as wires, capable of transmitting signals, data or information and may include combinations of conductors for varied electrical polarities or ground. "Conductor" as utilized herein, is an electrically conductive component, such as a wire, connector terminal, pin, socket, tab or any other component formed from an electrically conductive material. For example, the first and second cable segments 103, 105 are preferably made up of conductor pairs 201 (see e.g. FIG. 2) and configured to transfer data at high rates. The conductor pairs 201 are made up of a plurality of conductors 203 (see e.g., FIG. 2).

The cable splice 101 includes an insulation member 107 disposed intermediate to conductor pairs 201. Being "intermediate to", as utilized herein, is intended to mean that the insulation member 107 is physically disposed between the individual sets of conductor pairs 201 and provides sufficient shielding to reduce or eliminate cross-talk or other interference between adjacent conductor pairs 201. "Adjacent", as utilized herein includes close proximity between conductor pairs 201 sufficient to, if uninsulated, to have electrical interference or cross-talk. The system further includes a sealing member 109 at each end of splicing member 101. The sealing member 109 is preferably fabricated from a material substantially impermeable to moisture and to environmental conditions. For example, the sealing member 109 may be fabricated from a heat recoverable polymeric material that is heated to shrink fit and seal the junction between the first cable segment 103 and the cable splice 101 and the second cable segment 105 and the cable splice 101. In addition to sealing the cable splice 101 to the first and second cable segments 103,105, the sealing member 109 may also provide strain relief for the cable repair system 100. The insulation member 107 and conductor pairs 201 are disposed in a housing 111. The housing 111 may include any suitable electrically insulative material. For example, while not so limited, the housing may be fabricated from acrylonitrile butadiene styrene (ABS) or other electrically insulative polymer material.

Figure 2:
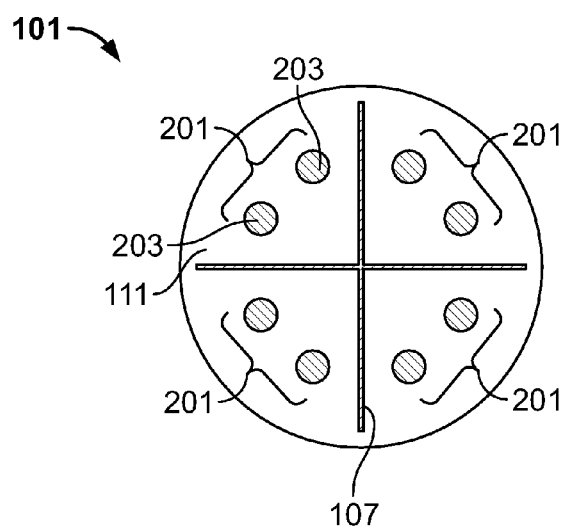
FIG. 2 shows a cross-sectional view of cable splice of FIG. 1 taken in direction 2-2.

FIG. 2 shows a cross-sectional view of cable splice 101 taken in direction 2-2, as shown in FIG. 1. The configuration shows FIG. 2 includes four conductor pairs 201 wherein the insulation member 107 includes a plus-sign geometry. The geometry of the insulation member 107 includes four shielded areas corresponding to the areas in which the conductor pairs 201 are disposed.

Figure 3:
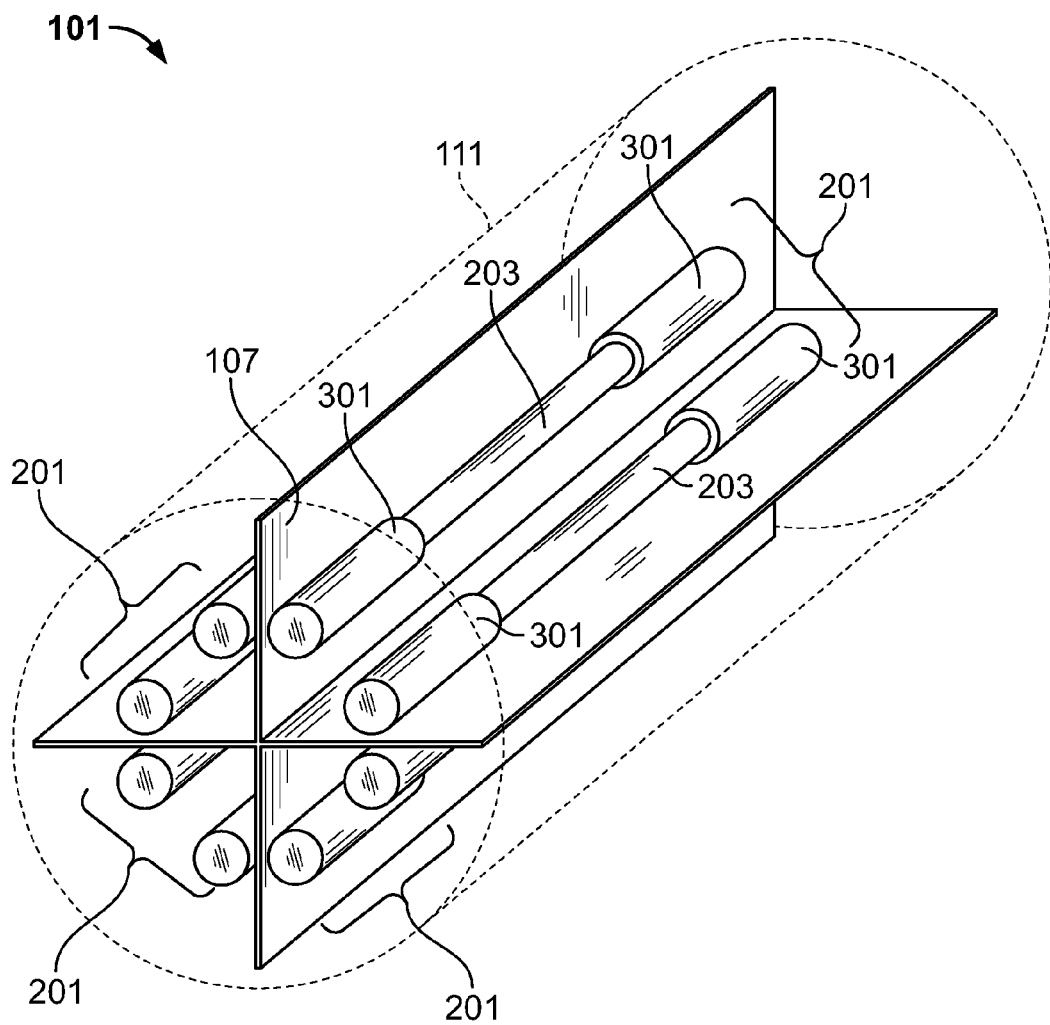
FIG. 3 shows a perspective view of a cable splice according to an embodiment of the present disclosure.

FIG. 3 shows a perspective view of a cable splice 101 with housing 111 removed. Conductor pairs 201 are disposed in electrically shielded areas formed by insulation member 107. The conductors 203 include a terminal 301. The terminal 301 includes any suitable electrically connectable structure. For example, terminal 301 may include a crimp, screw terminal, insulation displacement connector (IDC), poke-in terminal or any other structure known for connecting conductors. The insulation member 107 is sufficiently long to provide electrical shielding for the conductor 203, including the terminal 301. In certain embodiments of the present disclosure, the insulation member 107 includes electrical communication to a ground source and/or provide a ground pass-through within the cable splice 101. The electrical grounding of the insulation member 107 reduces or eliminates escapement of electrical interference. In addition, the grounding of the insulation member 107 may reduce or eliminate exterior or environmental electrical noise from entering the splice and further isolates each conductor pair from adjacent pairs 201.

Figure 4:
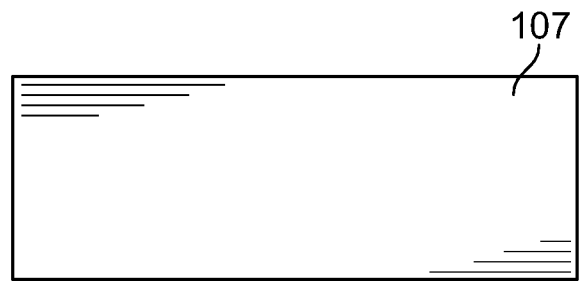
FIG. 4 shows an alternate arrangement of the insulation member.

FIG. 4 shows an alternate arrangement of the insulation member 107, corresponding to two positions for conductor pairs 201. The insulation member 107 includes a substantially planar configuration.

Figure 5:
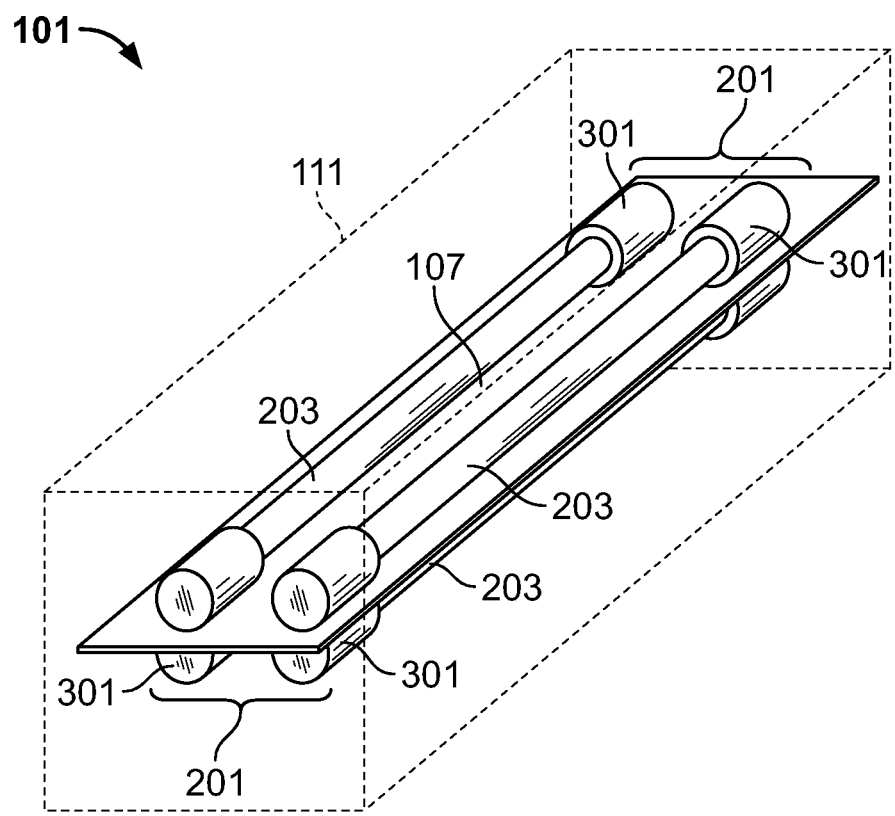
FIG. 5 shows the insulation member of FIG. 4 in a cable splice according to an embodiment of the present disclosure Wherever possible, the same reference numbers will be used throughout the drawings to represent the same parts.

FIG. 5 shows the insulation member 107 of FIG. 4 in a cable splice 101 according to an embodiment of the present disclosure with housing 111 removed. As shown, insulation member 107 is arranged such that conductors 203, including terminals 301 are insulated from electrical interference. Specifically, the insulation member 107 preferably is sufficiently long to extend for a distance greater than conductors 203 within cable splice 101.

While the above has been shown and described with respect to a two conductor pair 201 arrangement and for conductor pair 201 arrangement, the disclosure is not so limited. Any number of conductor pairs 201 may be present in cable splice 101. In addition, the insulation member 107 is not limited to the geometry shown and may include any configuration or geometry that provides area in which conductor pairs 201 may be disposed. In addition, the conductor pairs 201 may be partially or fully surrounded by insulation member in areas not adjacent to conductor pairs 201 to provide additional interference shielding.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A cable repair system for use with a first cable segment having at least two first conductor pairs and a second cable segment having at least two second conductor pairs comprising;
    a splicing member comprising:
        at least two splice conductor pairs with terminals provided at ends thereof;
        a shielding member disposed intermediate to the at least two splice conductor pairs, the shielding member being electrically grounded, the shielding member extending beyond the terminals provided as the ends of the at least two splice conductor pairs to provide electrical shielding between the length of the at least two splice conductor pairs and the terminals provided at ends thereof, the at least two splice conductor pairs and the terminals provided at ends thereof being disposed in electrically shielded areas formed by the shielding member, the shielding member being configured to shield the splice conductor pairs and the terminals provided at ends thereof from electrical interference from adjacent splice conductor pairs;
        a sealing member disposed at each end of the splicing member; and
    wherein the splice conductor pairs and the shielding member are configured to permit splicing of the first cable segments and the second cable segment and to reduce electrical interference between adjacent conductor pairs.

2. The cable repair system of claim 1, wherein the system includes four conductor pairs.

3. The cable repair system of claim 1, wherein the shielding member is electrically conductive.

4. The cable repair system of claim 1, wherein the shielding member comprises a metallic material.

5. The cable repair system of claim 1, wherein the shielding member is configured to electrically communicate with a ground of the one or more cables.

6. A method for splicing a data cable comprising:
    providing a first cable segment having at least two first conductor pairs;
    providing a second cable segment having at least two second conductor pairs providing a splicing member comprising:
        at least two splice conductor pairs with terminals provided at ends thereof;
        a shielding member disposed intermediate to the at least two splice conductor pairs, the shielding member being electrically grounded, the shielding member extending beyond the terminals provided as the ends of the at least two splice conductor pairs to provide electrical shielding between the length of the at least two splice conductor pairs and the terminals provided at ends thereof, the at least two splice conductor pairs and the terminals provided at ends thereof being disposed in electrically shielded areas formed by the shielding member, the shielding member being configured to shield the splice conductor pairs and the terminals provided at ends thereof from electrical interference from adjacent splice conductor pairs; and
        a sealing member disposed at each end of the splicing member;

connecting the at least two first conductor pairs of the first cable segment to the at least two splice conductor pairs of the splicing member; and connecting the at least two second conductor pairs of the second cable segment to the at least two splice conductor pairs of the splicing member;

wherein the splice conductor pairs and the shielding member are configured to permit splicing of the first cable segment and the second cable segment and to reduce electrical interference between adjacent conductor pairs.

7. The method for splicing a data cable of claim 6, wherein the splicing member provides electrical communication between the first cable segment and the second cable segment.

8. A repaired cable comprising:
   a first cable segment having at least two first conductor pairs;
   a second cable segment having at least two second conductor pairs;
   a splicing member comprising:
      at least two splice conductor pairs with terminals provided at ends thereof in electrical communication with the at least two first conductor pairs of the first cable segment and the at least two second conductor pairs of the second cable segment;
      a shielding member disposed between the at least two splice conductor pairs, the shielding member being electrically grounded, the shielding member having sufficient length to provide electrical shielding between the length of the at least two splice conductor pairs and the terminals provided at ends thereof, the at least two splice conductor pairs being disposed in electrically shielded areas formed by the shielding member, the shielding member being configured to shield the splice conductor pairs and the terminals provided at ends thereof from electrical interference from adjacent splice conductor pairs;
      a sealing member disposed at each end of the splicing member; the sealing member being substantially impermeable to moisture;
   wherein the splice conductor pairs and the shielding member are configured to permit splicing of the first cable segment and the second cable segment and to reduce electrical interference between adjacent splice conductor pairs.

9. The repaired cable of claim 8, wherein the splicing member provides electrical communication between the first cable segment and the second cable segment.

10. The repaired cable of claim 8, wherein the at least two splice conductor pairs includes four conductor pairs.

11. The repaired cable of claim 8, wherein the shielding member is electrically conductive.

12. The repaired cable of claim 8, wherein the shielding member comprises a metallic material.

13. The repaired cable of claim 8, wherein the shielding member is configured to electrically communicate with a ground of the at least two first conductor pairs.

* * * * *